(No Model.)
H. E. BRILL & D. EMORY.
COMBINED SEED AND FERTILIZER DROPPER.
No. 249,580. Patented Nov. 15, 1881.
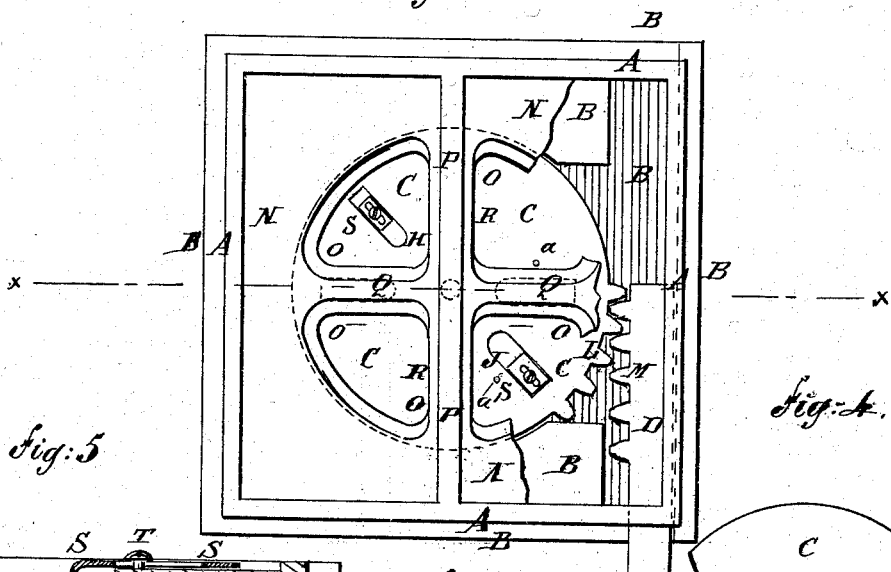
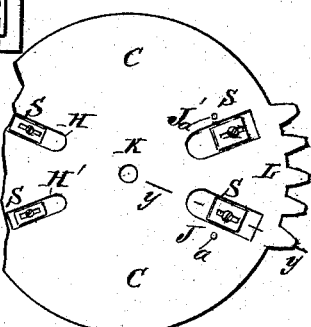
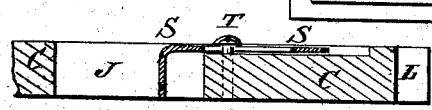
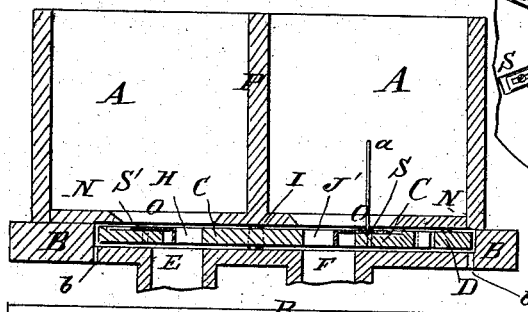
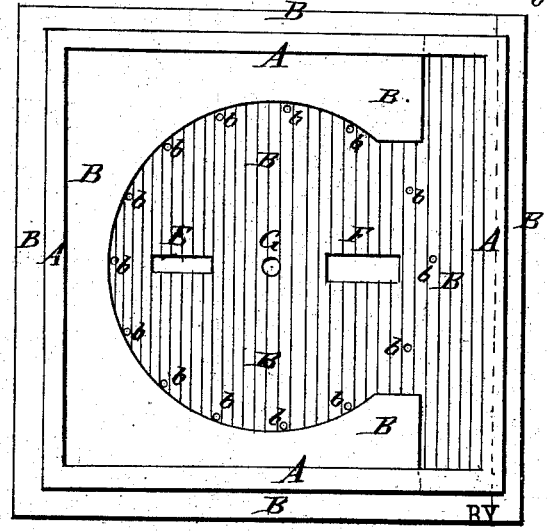
WITNESSES:
Chas. Nida
C. Sedgwick
INVENTOR:
H. E. Brill
D. Emory
ATTORNEYS.
N. PETERS, Photo-Lithographer, Washington, D. C.

UNITED STATES PATENT OFFICE.

HENRY E. BRILL AND DEARBORN EMORY, OF WAVERLY, OHIO.

COMBINED SEED AND FERTILIZER DROPPER.

SPECIFICATION forming part of Letters Patent No. 249,580, dated November 15, 1881.

Application filed June 4, 1881. (No model.)

*To all whom it may concern:*

Be it known that we, HENRY E. BRILL and DEARBORN EMORY, of Waverly, in the county of Pike and State of Ohio, have invented a new and useful Improvement in Combined Seed and Fertilizer Droppers, of which the following is a specification.

Figure 1 is a plan view of our improvement, part being broken away. Fig. 2 is a sectional elevation of the same, taken through the line *x x*, Fig. 1. Fig. 3 is a plan view of the same, the feed-plate, dropping-plate, and rack-bar being removed. Fig. 4 is a plan view of the dropping-plate. Fig. 5 is a section of the dropping-plate, taken through the line *y y*, Fig. 4.

Similar letters of reference indicate corresponding parts.

The object of this invention is to facilitate the dropping of seed and fertilizers and promote uniformity in the amount dropped.

A represents the hopper, the bottom B of which is recessed upon the upper side to receive the dropping-plate C and the rack-bar D. In the bottom B is formed a hole, E, for the seed to pass through, a larger hole, F, for the fertilizer to pass through, and a hole, G, for the pin I, that pivots the dropping-plate C to the said bottom B. The dropping-plate C is made circular in form and has two holes, H H', formed through it to receive seed alternately and convey it to the hole E in the bottom B, two holes, J J', to receive the fertilizer and convey it to the hole F in the bottom B, and a hole, K, to receive the pivoting-pin I. The hole K is formed in the center of the plate C, and the holes J J' are at a little distance apart and in line alternately with the holes H H', which are placed upon the opposite sides of the central hole, K, as shown in Fig. 4. The dropping-plate C is made of a thickness equal to the depth of the recess in which it is placed, so that the upper surface of the said plate C will be flush with the upper surface of the bottom B. Upon the edge of one side of the dropping-plate C are formed teeth L, to mesh into the teeth M of the rack-bar D, so that the dropping-plate C will receive a reciprocating rotary movement from the reciprocating rectilinear movement of the rack-bar D. Motion can be given to the rack-bar D by a hand-lever or from the drive-wheels of the planter by any of the ordinary devices for such purposes.

The dropping-plate C is covered by the feed-plate N, which is fitted into the lower part of the hopper A, and is secured to the hopper-bottom B. In the feed-plate N, around its center, are formed four quadrantal apertures, O, to allow the seed and fertilizer to come in contact with the dropping-plate C and fill the apertures H H' J J'.

The hopper A is divided into two compartments by a partition, P, the lower edge of which rests upon the feed-plate N. The various parts of the apparatus are so arranged that the holes E F of the bottom B will be directly beneath two opposite spaces, Q, between the apertures O, and the partition P will be directly over the other spaces, R, between the said apertures O.

With this construction, when the rack-bar D is moved in one direction, the holes H J of the dropping-plate C will pass beneath the apertures O to receive seed and fertilizer. As the rack-bar D moves in the opposite direction the other holes, H' J', of the dropping-plate C will pass beneath the other apertures, O, to receive seed and fertilizer, and the holes H J will pass beneath the space or bar Q, to drop their contents through the holes E F in the bottom B to the ground, and so on, the holes in the plate C receiving seed and fertilizer in pairs and dropping them to the ground. The space or bar Q of the feed-plate N serves as a cut-off to prevent the apertures of the dropping-plate C from carrying out any more seed and fertilizer than will fill them.

In grooves in the upper side of the dropping-plate C are placed plates S, the inner parts of which are bent downward into the apertures or holes in the said plate, as shown in Fig. 5. The upper parts of the plates S are slotted longitudinally to receive the screws T, by which the said plates are secured to the plate C, so that by loosening the screws T the plates S can be adjusted to enlarge or lessen the said apertures to drop more or less seed and fertilizer, as may be required.

To the dropping-plate C, at the outer sides of the fertilizer-receiving apertures J J', are attached the lower ends of rods *a*, which project upward into the hopper and are moved by the movements of the said dropping-plate C to stir the fertilizer, so that it will pass freely into the apertures J J' and will be dropped regularly.

In the recess of the hopper-bottom B, close to the edge or shoulder of the said recess, are formed a number of small holes, b, for the escape of any dust that may find its way in and around the dropping-plate C, to prevent the said dropping-plate from becoming clogged by the packing of the said dust.

Having thus fully described our invention, we claim as new and desire to secure by Letters Patent—

In a combined seeder and fertilizer-dropper, the combination, with the compartment-hopper A, having a recessed bottom, B, provided with the holes E F G, the feed-plate N, provided with quadrantal openings O, and the rack-bar D, of the feed-plate C, provided with teeth L on its periphery, and with the adjustable apertures H H' J J', substantially as shown and described.

HENRY ELMORE BRILL.
DEARBORN EMORY.

Witnesses:
PHILIP LORBACH,
O. P. BEEKMAN.